W. B. BENNITT.
CONTROLLER FOR ELECTRIC MOTORS.
APPLICATION FILED OCT. 2, 1912.

1,196,730.

Patented Aug. 29, 1916.

WITNESSES:

INVENTOR
William B. Bennitt
BY
ATTORNEY

UNITED STATES PATENT OFFICE.

WILLIAM BRABINER BENNITT, OF BRANKSOME, ASHTON-UPON-MERSEY, ENGLAND, ASSIGNOR TO WESTINGHOUSE ELECTRIC AND MANUFACTURING COMPANY, OF PITTSBURGH, PENNSYLVANIA.

CONTROLLER FOR ELECTRIC MOTORS.

1,196,730.  Specification of Letters Patent.  Patented Aug. 29, 1916.

Application filed October 2, 1912. Serial No. 723,465.

*To all whom it may concern:*

Be it known that I, WILLIAM BRABINER BENNITT, a subject of the King of Great Britain, and a resident of Branksome, Glebelands Road, Ashton-upon-Mersey, Cheshire, England, electrical engineer, have made new and useful Improvements in Controllers for Electric Motors, of which the following is a specification.

My invention relates to drum type controllers for electric motors having overload and no-voltage release devices, and has for its object to provide an improved controller of this character in which the motor circuit is first connected to the line and changes in the motor connections and variations of the amount of resistance in circuit are subsequently effected by the continuous operation of a single handle in the same direction, and in which when either of the overload or no-voltage release devices act to disconnect the motor circuit from the line, it is necessary to return the controller to the "zero" or "off" position before the motor circuit can be again connected thereto.

According to my present invention, the improved controller is provided with two drums and a single operating handle. The drum which is adapted to connect the motor circuit to the source of supply is mounted loosely on the controller shaft but is adapted to be operatively connected thereto so as to be rotated thereby until it reaches a position in which it is held by a catch, whereupon the operative connection between it and the controller shaft is broken. When the drum is in this position either the no-voltage or the overload release mechanism can operate to release the catch and cause the return of the drum to the "zero" or "off" position, in which the motor circuit is disconnected from the source of supply. In this case the operative connection between the drum and the shaft cannot be reestablished in order to again connect the motor to the source of supply, except by rotating the handle and shaft back to the "zero" or "off" position. The second drum which is rigidly secured to and at all times moves with the controller shaft is used for making changes in the connections of the motor circuit and to vary the amount of resistance in circuit therewith.

Figure 1:
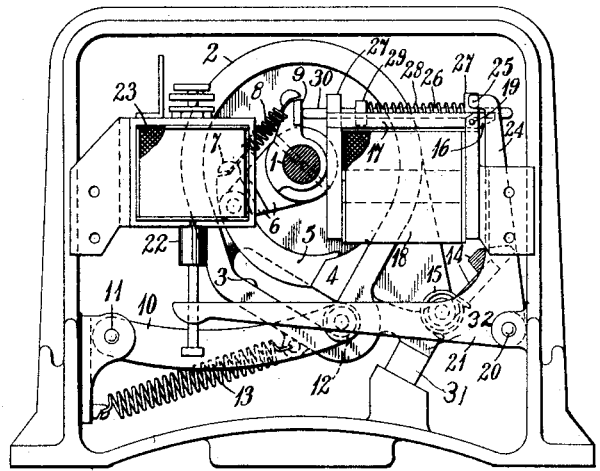
Figure 2:
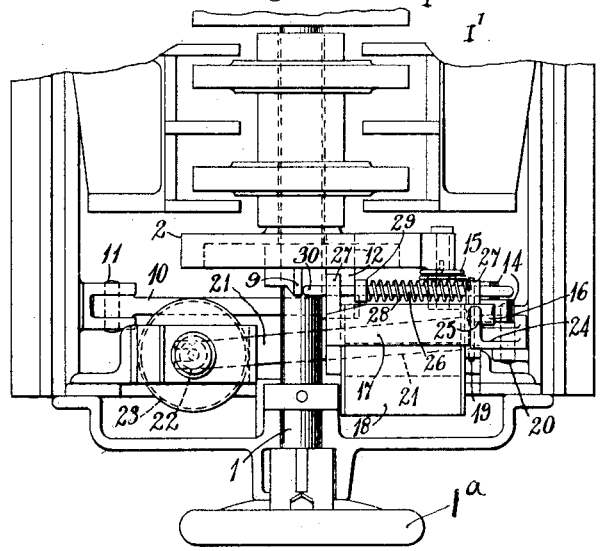

In order that the nature of my invention may be clearly understood, a controller constructed in accordance therewith will now be described by way of example, Figure 1 of the accompanying drawing being an end view thereof with the cover removed and Fig. 2 being a plan view of a portion of the same.

Referring to the drawing, a controller shaft 1, has two drums $1^r$ and $1^1$ mounted upon it, the first of which controls the various motor circuit connections and effects the resistance changes and is rigidly secured to the shaft, and the other drum $1^1$ is loose on the shaft and carries contact members for connecting the motor circuit to the source of supply. The construction of the drums and of the stationary contact members with which they coöperate may be of any suitable or well known description and it has not been deemed necessary to illustrate this portion of the apparatus. Secured to the last mentioned drum is a plate 2 that is provided with a cam slot 3 near its edge, and a stop 4 which is adapted to be engaged by a pawl 5 having a pivotal connection to a crank 6 secured to the shaft 1. The tail 7 of the pawl 5 is connected by a spring 8 to a projection 9 forming a portion of the crank 6 as shown, by which means the free end of the pawl tends to move outwardly from the shaft.

An arm 10 is pivoted on a pin 11 to a fixed part of the controller case and carries a roller 12 which projects into the slot 3. The plate 2 is provided with a spring 13 which tends to rotate it in a clockwise direction and thereby to return it to the "zero" or "off" position. Pivoted to the plate 2 is a latch 14 that is provided with a spring 15 which causes it to engage a projection 16 of an armature 17 of a no-voltage magnet 18. Said armature 17 is pivoted on a pin 19. Pivoted to a fixed part 20 of the controller case, is a bell crank lever, one arm 21 of which is operatively connected to a core 22 of an overload coil 23, another arm 24 of said lever having a projection 25 which engages the side of the latch 14 when the latter is held by the projection 16. A pin 26 is adapted to slide in bearings 27 that are supported by the no-voltage release magnet 18 or other suitable part of the controller. A spring 28 abuts against a collar 29 on said pin 26 and tends to force the end 30 thereof toward the projection 9 of the crank 6. The other end of said pin 26 is adapted to engage the latch 14 when the latter engages the projection 16. A stop 31 abuts against a projecting part 32 of the plate 2 when the controller drums are in the "zero" or "off" position.

The operation of the mechanism above described is as follows:—When the controller is in its "zero" or "off" position, the various parts of the mechanism occupy the position shown in the drawings. If the controller shaft 1 is moved by means of a handle 1ª in the counter-clockwise direction, the pawl 5 will engage with the stop 4, thereby rotating the plate 2 and with it the loose drum 1¹ to a position in which the motor circuit is connected to the source of supply. This movement of the plate 2 causes the roller 12 to travel in the slot 3 and thereby engage with the outer edge of the pawl 5, so as to gradually force said pawl inwardly toward the controller shaft 1 against the tension of the spring 8 and ultimately disengage said pawl from the stop 4. Before this action occurs, the latch 14 will engage the projection 16 on the armature 17 of the no-voltage coil 18 and the plate 2, together with the loose drum 1¹, will be thereby held in a position in which the supply circuit to the motor is closed. Further movement of the controller shaft 1 in the same direction will cause the fixed drum 1² to effect the desired resistance changes and circuit connections of the motor in the usual manner.

If an overload occurs, coil 23 will cause the core 22 to move inwardly, thereby rotating the bell crank lever on its pivot 20 and causing the projection 25 on the arm 24 of said lever to force the latch 14 out of engagement with the projection 16, thereby permitting the plate 2 and the drum 1¹ connected therewith to rotate in a clockwise direction under the influence of the spring 13 back to the "zero" or "off" position, so that the connection of the motor circuit to the source of supply will be interrupted. The pawl 5 and the controller shaft 1 will remain in the positions to which they have been moved, and in order to again connect the motor to the source of supply, it will be necessary to move the controller handle 1ª back to the "zero" position in order that said pawl 5 can reëngage with the stop 4.

If the voltage of the source of supply to which the motor is connected should fail, the armature 17 of the no-voltage coil 18 will move upwardly on its pivot 19 so that the latch 14 will be disengaged from the projection 16 and the plate 2 and loose drum 1¹ will consequently be rotated by the spring 13 to the "off" position as before. In this case also it is evident that the controller will have to be returned to the "off" position before the line circuit can be again closed.

If, when the motor is connected to the source of supply, it is desired to break the circuit for the purpose of stopping the motor, the controller handle 1ª is moved in a clockwise direction, and, just before reaching the "off" position the projection, 9 will engage the pin 26 and move it to the right against the force of the spring 28 so as to disengage the latch 14 from the projection 16, thereby permitting the spring 13 to rotate the plate and loose drum 1¹ to the "off" position to break the motor circuit.

The structural details of the overload and no-voltage coils have not been described, as they are well known to persons skilled in the art, and it is evident that various alterations may be made in the shapes of the different parts of the mechanism without exceeding the scope of my invention.

What I claim is:—

1. The combination with a rotatable shaft, a contact-carrying drum loosely associated therewith and biased to its off position, and mechanical means for initially operatively connecting said drum and shaft and subsequently disconnecting said parts in a predetermined position thereof, of means dependent upon different predetermined electrical conditions for restraining said drum prior to its disconnection from said shaft and independent of further movements thereof.

2. A controller comprising a rotatable shaft, a contact-carrying drum fixed thereto, a second contact-carrying drum loosely associated therewith, a pawl for normally locking said second drum to said shaft, means for releasing said pawl under predetermined conditions, means for restraining said second drum in a predetermined operating position, and a plurality of means, dependent upon different conditions for releasing said restraining means.

3. A controller comprising a rotatable shaft, a contact-carrying drum loosely associated therewith, means for temporarily locking said drum to said shaft while said drum and shaft are rotated, means for unlocking said drum and shaft in a predetermined position, and means dependent upon normal electrical conditions for restraining said drum in said predetermined position.

4. The combination with a rotatable shaft, a contact-carrying drum loosely associated therewith and biased to its off position, and mechanical means for initially operatively connecting said drum and said shaft and subsequently disconnecting said parts in a predetermined position thereof, of a latch for restraining said drum in position after it is disconnected from said shaft, and a plurality of electro-responsive devices severally adapted to release said latch under predetermined conditions.

5. The combination with a rotatable shaft, a resistance-controlling drum fixed thereto, a circuit making and breaking device loosely associated therewith, means for operatively connecting said device to said shaft during a portion of the movement thereof and means for disconnecting said device and shaft after a predetermined movement thereof, of means for restraining said device in its closed position after the disconnection of said device and said shaft to permit further movement of said resistance-controlling drum, and an overload and a no-voltage device for releasing said restraining means under predetermined conditions.

6. The combination with a rotatable shaft, a contact drum loosely associated therewith and biased to its off position, and means for operatively connecting said drum and said shaft during a predetermined portion of its movement, of a latch for restraining said drum in position after the operative connection with the shaft is broken, electro-responsive means for releasing said latch and means associated with said shaft for releasing said latch when said shaft is moved back to its off position.

7. The combination with a rotatable shaft, a make-and-break device loosely surrounding said shaft and biased to its off position, a slotted disk associated with said device, a pawl carried by said shaft and adapted to form a driving connection with said disk, and means disposed in said slot for releasing said pawl after a predetermined movement of said shaft and make-and-break device, of electro-responsive means for restraining said disk and associated device in position when said pawl is released.

8. The combination with a rotatable shaft, a make-and-break device loosely surrounding said shaft and biased to its off position, a slotted disk associated with said device, a pawl carried by said shaft and adapted to form a driving connection with said disk, and means disposed in said slot for releasing said pawl after a predetermined movement of said shaft and make-and-break device, of a latch for restraining said disk and associated make-and-break device in position when said pawl is released, and a manually operated means and an electro-responsive means for releasing said latch.

In testimony whereof I have hereunto subscribed my name this eighteenth day of September 1912.

WILLIAM BRABINER BENNITT.

Witnesses:
JAS. STEWART BROADFOOT,
H. R. KITSON.

Copies of this patent may be obtained for five cents each, by addressing the "Commissioner of Patents, Washington, D. C."